Jan. 7, 1941.  W. F. THUMM  2,228,186

SINK

Filed May 9, 1940

Inventor
William F. Thumm
by James R. McKnight
his Attorney

Patented Jan. 7, 1941

2,228,186

UNITED STATES PATENT OFFICE 2,228,186

SINK

William F. Thumm, Lombard, Ill.

Application May 9, 1940, Serial No. 334,135

3 Claims. (Cl. 4—170)

My invention relates to a sink and drain board combination and means and methods for assembling the same.

Among the objects of my invention is to provide means and method for quickly and removably attaching a sink to a drain board; to supply attachment means which will permit the removal of a broken or cracked sink bowl and its replacement by a new sink bowl without the destruction or alteration of the drain board; to create attachment means which will also act as a seal, and such other objects, advantages and capabilities as will later more fully appear and which are inherently possessed by my invention.

While I have shown in the accompanying drawing a preferred form of my invention, yet I desire it understood that the same is susceptible of modification and change without departing from the spirit of my invention.

Figure 1:
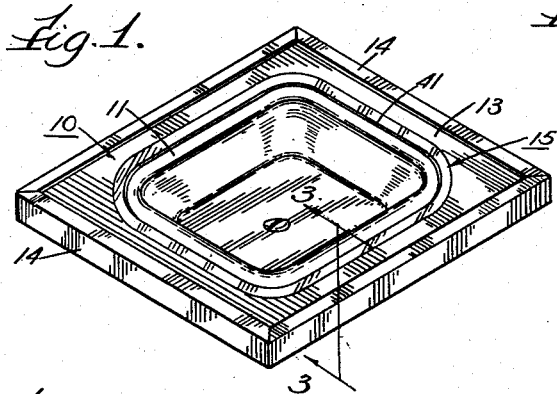
Figure 2:
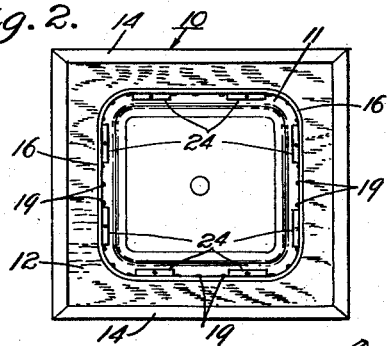
Figure 3:
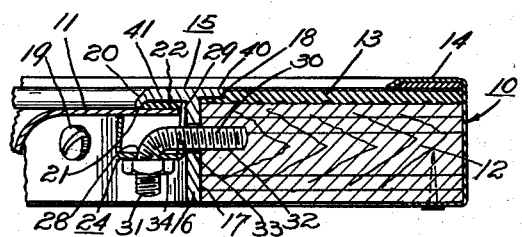
Figure 5:
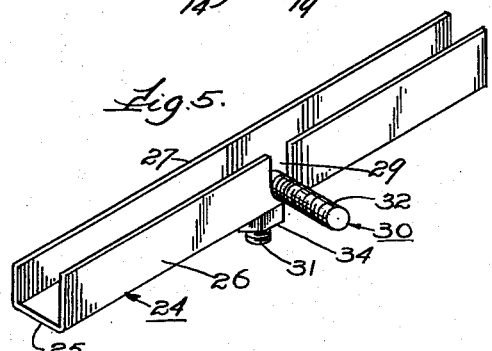
Figure 4:
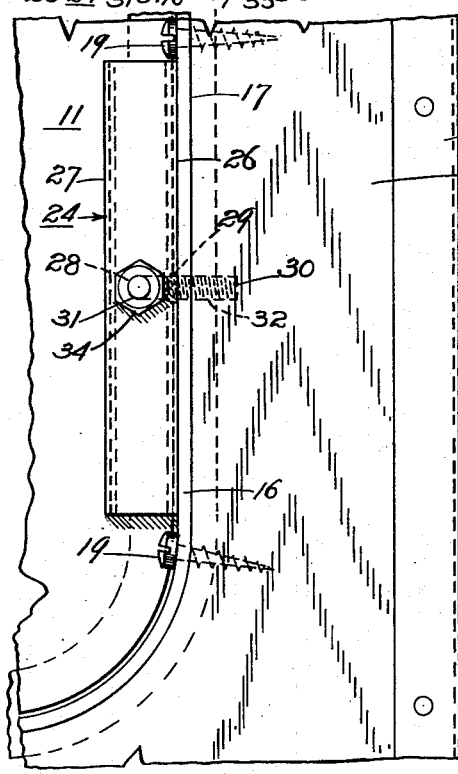
Figure 6:
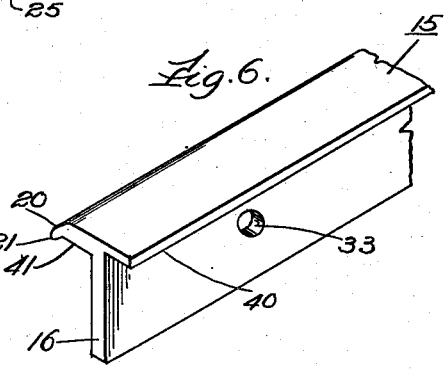

Referring to the drawing Fig. 1 is a perspective view of my sink; Fig. 2 is a bottom plan view of the same; Fig. 3 is a detailed sectional view of my sink as shown on line 3—3 of Fig. 1; Fig. 4 is a plan view of one of my clamping members in position; Fig. 5 is a perspective view of one of my clamping members, and Fig. 6 is a perspective view of a portion of my trim and rim member.

The embodiment selected to illustrate my invention comprises means for removably attaching the rim 11 of a sink bowl to a drain board 10. My drain board 10 has a base 12 preferably made of wood, and a surface 13 preferably made of linoleum or other suitable composition attached to the upper surface of said base 12. An outer moulding 14 preferably of stainless steel is attached to the outer edges of the drain board 10 and is bent inwardly against its top and bottom surfaces.

In order to quickly and removably attach the rim 11 of the sink bowl to the drain board 10 I provide a substantially T shaped sink rim and drain board trim member 15 of aluminum or any suitable metal. My member 15 has a vertical portion 16 adapted to lie against the inner edge 17 of the drain board 10. At the upper end of vertical portion 16 an outer flange 40 extends substantially at right angles therefrom and lies within a groove 18 rabbetted from the surface 13 of the drain board 10, so as to form a flush and water tight surface therewith, and held so by a plurality of spaced screws 19 extending from the vertical portion 16 into the wood base 12 of drain board 10. The lower end of the vertical portion 16 is also thereby held flush with the bottom of the base 12 of the drain board 10 by screws 19.

At the upper end of the vertical portion 16 of member 15 an inner flange 41 begins substantially at right angles therefrom and has a tapered surface 20 leading from the end of its inner top portion downwardly to form a feather edge 21 at its lower inner end. The feather edge 21 is adapted to contact the rim 11 of the sink to form a seal therewith. In the space 22 between the feather edge 21 and the vertical portion 16 I provide a supply of mastic or other suitable filler, which forms with the feather edge 21 a perfect water-tight seal.

In order to attach the sink to the member 15 I provide a plurality of spaced fastening constructions. Each of said fastening constructions comprises an elongated U or channel-shaped clamping member 24 having a central portion 25 with leg 26 depending from one side being longer than leg 27 on the other side. Substantially centrally positioned in central portion 25 is an aperture 28 and substantially centrally positioned in longer leg 26 is slot 29.

The clamping member 24 is positioned with the shorter leg 27 contacting the under portion of the rim 11, and with the longer leg 26 lying with its bottom end on inner flange 41 of member 15. This spaces the outer edge of rim 11 from vertical portion 16 of member 15, and creates a leverage so that shorter leg 27 exerts greater upward pressure on the under portion of rim 11, forcing the upper portion of the rim 11 more tightly against feather edge 21.

A threaded bolt 30 is bent substantially at right angles to form a shorter leg 31 and a longer leg 32.

The longer leg 32 is inserted through an aperture 33 in vertical portion 16 of member 15 and into the base 12. The clamping member 24 is placed against bolt 30 with slot 29 over longer leg 32 and with shorter leg 31 extending through aperture 28 in central portion 25. A threaded nut 34 on shorter leg 31 is turned until the nut 34 rests tight against central portion 25. Upon upward pressure of nut 34 on shorter leg 31, longer leg 32 is moved downwardly at an angle to a more snug engagement within base 12. This in turn moves shorter leg 31 from its original vertical position to a slight angular position so that the threads of shorter leg 31 bear against central portion 25 to one side of aperture 28 and prevent accidental downward movement of shorter leg 31.

Having thus described my invention, I claim:

1. In a construction for removably attaching a sink bowl to a drain board, a substantially U shaped clamping member having an opening in its central portion and a slot in its outer leg portion, a threaded bolt having its outer end extending at right angles, through said slot in said clamping member and into said drain board, the inner end of said threaded bolt extending through said opening in said clamping member, said clamping member contacting the rim of said sink bowl, a nut threaded to engage the inner end of the bolt below the opening in the clamping member, said nut adapted when tightened to apply downward pressure on the outer end of the bolt for angular contact within the drain board, said angular movement of said outer end of the bolt also causing angular movement of the inner end of the bolt so that the threads on the inner end of the bolt will engage the clamping member to the side of the opening and prevent downward movement of the bolt.

2. In a construction for removably attaching a sink bowl to a drain board, a T shaped member with its vertical portion attached to the inner edge of said drain board, and with one of its top portions having a feather edge contacting the upper inner surface of the rim of the sink bowl, said feather edge leaving a space between and above its lower extent and the vertical portion of the T shaped member and the upper surface of the rim, and a mastic-like filler in said space, said feather edge contact and said filler forming a water tight seal between the drain board and the sink bowl.

3. In a construction for removably attaching a sink bowl to a drain board a plurality of spaced fastening members, each of said fastening members being U shaped with a shorter inner leg, a longer outer leg and a central connecting portion, the inner shorter leg contacting the under surface of the rim of the sink bowl, each of said fastening members having an aperture in its central connecting portion and a slot in its longer leg, a plurality of threaded bolts, each bolt bent at right angles with its outer end extending through the slot of one of the fastening members into the inner edge of the drain board and its inner end extending through the aperture of one of the fastening members, a plurality of nuts, each nut threaded to engage the inner end of one of the bolts below the opening in one of the fastening members, each of said nuts adapted when tightened to apply downward pressure on the outer end of its bolt for angular contact within the drain board, said angular movement of said outer end of each bolt also causing angular movement of the inner end of the bolt so that the threads on the inner end of the bolt will engage the fastening member to the side of the opening and prevent downward movement of the bolt.

WILLIAM F. THUMM.